(12) United States Patent
Iwasaki et al.

(10) Patent No.: US 8,102,304 B2
(45) Date of Patent: Jan. 24, 2012

(54) DISTANCE MEASURING EQUIPMENT AND DISTANCE MEASURING EQUIPMENT MONITOR SYSTEM

(75) Inventors: Masaki Iwasaki, Kawasaki (JP); Yoshirou Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 40 days.

(21) Appl. No.: 12/690,359

(22) Filed: Jan. 20, 2010

(65) Prior Publication Data

US 2010/0328139 A1 Dec. 30, 2010

(30) Foreign Application Priority Data

Jun. 26, 2009 (JP) ................................ 2009-152484

(51) Int. Cl.
*G01S 13/08* (2006.01)
(52) U.S. Cl. .............................. 342/47; 342/51; 342/174
(58) Field of Classification Search ............... 342/42–51
See application file for complete search history.

(56) References Cited

U.S. PATENT DOCUMENTS

| | | | | |
|---|---|---|---|---|
| 4,128,835 A | * | 12/1978 | Russell ............................ | 342/46 |
| 4,566,009 A | * | 1/1986 | Hanni et al. ..................... | 342/45 |
| 4,654,810 A | * | 3/1987 | Becker et al. ................... | 702/89 |
| 2005/0237155 A1 | * | 10/2005 | Hohberger et al. ........... | 340/10.1 |
| 2007/0260293 A1 | * | 11/2007 | Carpenter et al. .............. | 607/60 |
| 2008/0024279 A1 | * | 1/2008 | Gravelle et al. ............... | 340/10.3 |
| 2008/0297398 A1 | * | 12/2008 | Kamimura ....................... | 342/38 |
| 2009/0267743 A1 | * | 10/2009 | Faroe et al. ................... | 340/10.1 |

FOREIGN PATENT DOCUMENTS

| | | | |
|---|---|---|---|
| GB | 2 442 777 A | | 4/2008 |
| GB | 2442777 A | * | 4/2008 |
| JP | 2008-286683 | | 11/2008 |

OTHER PUBLICATIONS

"Minimum Operational Performance Specification for Distance Measurement Equipment (DME/N and DME/P)", The European Organisation for Civil Aviation Equipment, Dec. 1986, ED-57, 51 pages.
Australian Office Action issued on Jan. 17, 2011, in Australian Patent Application No. 2010200239.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

A transponder (12) transmits a reply in response to an interrogation input thereto, the interrogation including twin pulses, and a monitoring processor (13) transmits to the transponder a pseudo interrogation identical in format to the interrogation, receives from the transponder a reply responding to the pseudo interrogation, and monitors a performance of the transponder, the monitoring processor (13) including a pulse spacing adjuster (131c) operable to adjust a pulse spacing of twin pulses along with generation of the pseudo interrogation, and a monitor (134b) operable to output an alarm in response to a failed reception or a delayed reception of a reply from the transponder after transmission of a pseudo interrogation with a compliant pulse spacing, and further to output an alarm in response to a reception of a reply from the transponder after transmission of a pseudo interrogation with an uncompliant pulse spacing.

16 Claims, 4 Drawing Sheets

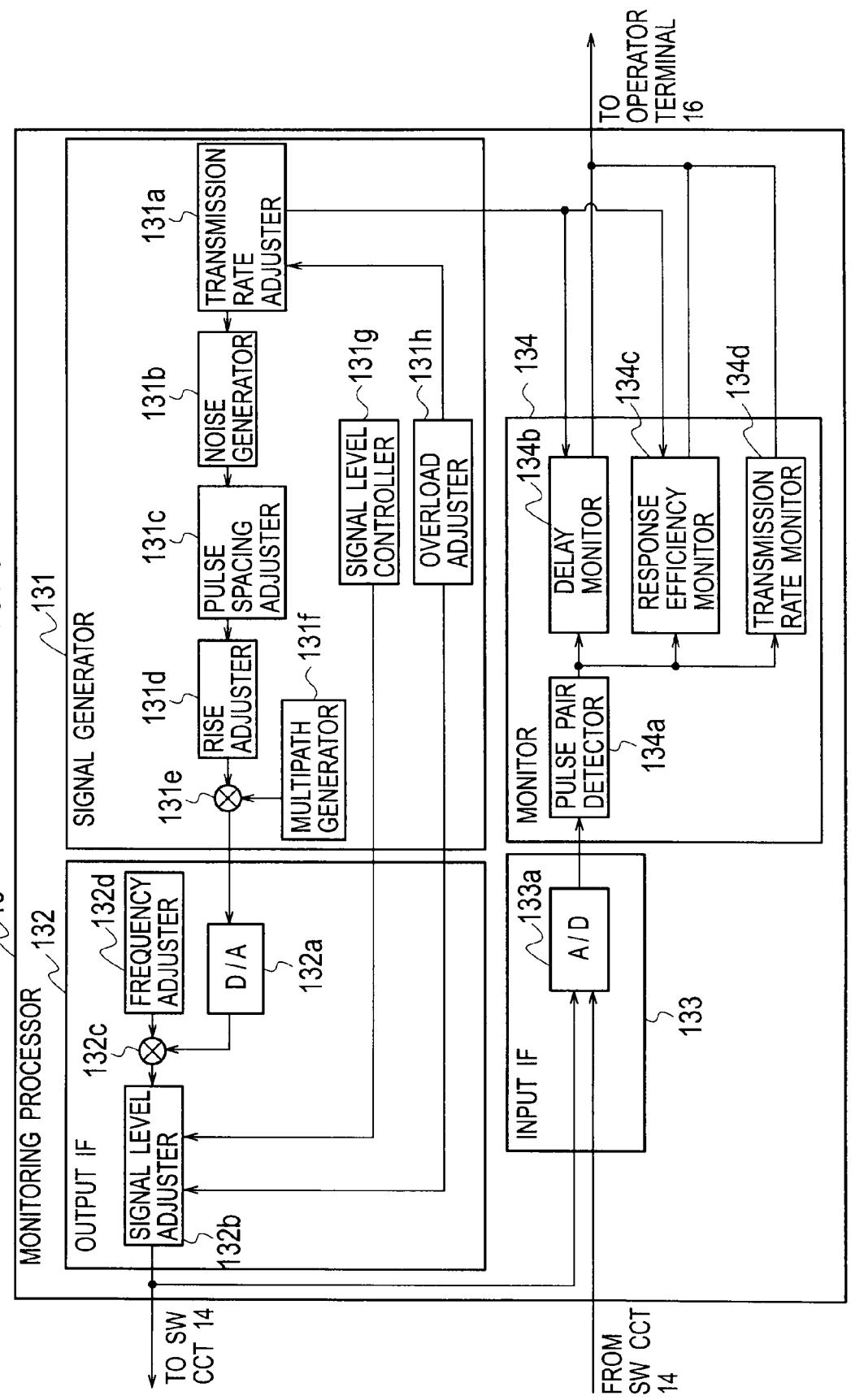

us 8,102,304 B2

DISTANCE MEASURING EQUIPMENT AND DISTANCE MEASURING EQUIPMENT MONITOR SYSTEM

CROSS REFERENCE TO RELATED APPLICATIONS

The present application claims the benefit of priority under 35 U.S.C. §119 to Japanese Patent Application No. 2009-152484, filed on Jun. 26, 2009, the entire contents of which are incorporated herein by reference.

BACKGROUND OF THE INVENTION

1. Field of Art

The present invention relates to a distance measuring equipment (referred herein sometimes to "DME") installed at a ground station to transmit replies to interrogations received from aircraft measuring the distance relative to the ground, and a distance measuring equipment (DME) monitor system.

2. Description of Relevant Art

The DME is used for measurement of distance between aircraft and the ground (refer to Japanese Patent Application Laid-Open Publication No. 2008-286683).

FIG. 1 illustrates a DME 1a installed on the ground, and adapted to receive a sequence of interrogations transmitted from an interrogator 20 mounted on aircraft 2. The DME 1a is adapted to transmit to the interrogator 20 on aircraft 2 a sequence of replies responding to interrogations the DME 1a has received. The aircraft 2 can make use of a round-trip time required for signal transmission and reception, for measurement of distance between the aircraft and a reference location on the ground (e.g., location where the DME 1a is installed).

As shown in FIG. 2, the DME 1a has a transponder 12 configured for transmission of replies to interrogations received from aircraft 2. As illustrated in FIG. 3(a) and FIG. 3(b), the (interrogator 20 on) aircraft 2 transmits (at a time t1) an interrogation P1. This is received by the (transponder 12 in) DME 1a, which responds it by transmitting a reply P2 with a precise preset delay of time Td. The aircraft 2 can receive (at a time t2) the reply P2 from the (transponder 12 in) DME 1a, and calculate a round-trip time T (=t2−t1) from (pulse rise time t1 at the) transmission of interrogation P1 to (pulse rise time t2 at the) reception of reply P2, for use to determine a position of the aircraft 2.

Interrogations P1 and replies P2 are each prescribed, i.e., formatted in advance to a prescript of style. Simply to reception of an interrogation P1 compliant with the prescript, the transponder 12 responds with transmission of a reply P2. Interrogations P1 as well as replies P2 are each composed of a pair of pulses referred herein to as a pulse pair or twin pulses. In the example of mode illustrated in FIGS. 3(a) and 3(b), interrogations P1 as well as replies P2 are each composed of a pair of pulses that have a 3.5 μs pulse width, and a 12 μs pulse spacing or interval.

Referring to FIG. 2, the DME 1a includes: an antenna 11; the transponder 12 being composed of first and second transponders 12a and 12b of an identical configuration; a monitoring processor 13 being composed of first and second monitoring processors 13a and 13b; a switching circuit 14; and a controller 15 for controlling the transponder 12 and the monitoring processor 13.

The monitoring processor 13a and 13b are configured to generate a pseudo interrogation identical in format of style to those interrogations P1 compliant with the above-noted prescript, to output to the transponder 12. The pseudo interrogation being identical in format of style to interrogations P1 is input from the monitoring processor 13, through the switching circuit 14, to the transponder 12, where it is processed like a normal interrogation P1 (that the transponder 12 has received via the antenna 11 and the switching circuit 14), without checks if it is any pseudo interrogation, to generate a reply P2 thereto.

Accordingly, the transponder 12 works for generation of a reply P2 responding to a normal interrogation P1 received from aircraft 2, and for generation of a reply P2 responding to a pseudo interrogation received from the monitoring processor 13. The switching circuit 14 is adapted, with the former P2 input thereto from the transponder 12, to work for a switching to transmit the input reply P2 via the antenna 11 to aircraft 2, and with the latter P2 input thereto, to work for a switching to output the input reply P2 to the monitoring processor 13.

The reply P2 responding to pseudo interrogation is input from the switching circuit 14 to the monitoring processor 13, whereby the processor 13 is given information, such as on if the reply P2 is input thereto and on the timing of input, and employs this for a monitoring to determine whether or not the transponder 12 is in a conforming performance to transmit a reply P2 in response to a normal interrogation P1 it has received.

The DME 1a is configured in compliance with associated prescripts specifying, among others besides the format of style, frequencies of interrogations P1 and replies P2 to be processed, and transmission rates, as well, in order to implement transmission of a reply P2 in response to reception of a prescript-compliant interrogation P1. For signals to be processed at DME transponders, prescripts are standardized. For enhancement in integrity of DME performance, transponders are required to have a specified integrity, cf. "Minimum Performance Specification for Ground Distance-Measuring Equipment (DME) ED-57", EUROCAE, 1986.

The transponder 12 of DME 1a is subject to a performance verification to determine whether or not the transponder 12 meets a required integrity of performance. The performance verification of transponder 12 needs use of dedicated jigs, facilities, etc. Additionally, it spends too much time, costing dearly.

Likewise, conventional DME's have been subject to a performance verification of transponder needing dedicated jigs and facilities, spending too much time, costing dearly.

It is an object of the present invention to provide a distance measuring equipment, and a distance measuring equipment monitor system, permitting a facilitated verification of transponder performance, allowing for an enhanced efficiency of performance verification.

SUMMARY OF THE INVENTION

According to an aspect of the present invention, a distance measuring equipment comprises a transponder configured to transmit a reply in response to an interrogation input thereto, the interrogation comprising twin pulses composed of a pair of pulses having a prescribed spacing, and a monitoring processor configured to transmit to the transponder a pseudo interrogation identical in format to the interrogation, receive from the transponder a reply responding to the pseudo interrogation, and monitor a performance of the transponder, the monitoring processor comprising a pulse spacing adjuster configured to adjust a pulse spacing of a pair of pulses constituting twin pulses of the pseudo interrogation along with generation of the pseudo interrogation, and a monitor configured to output an alarm in response to a failed reception or a delayed reception of a reply from the transponder after transmission of the pseudo interrogation.

BRIEF DESCRIPTION OF THE DRAWINGS

FIG. 5 is a block diagram of a monitoring processor of the DME of FIG. 4.

DETAILED DESCRIPTION OF THE EMBODIMENTS

Figure 1:
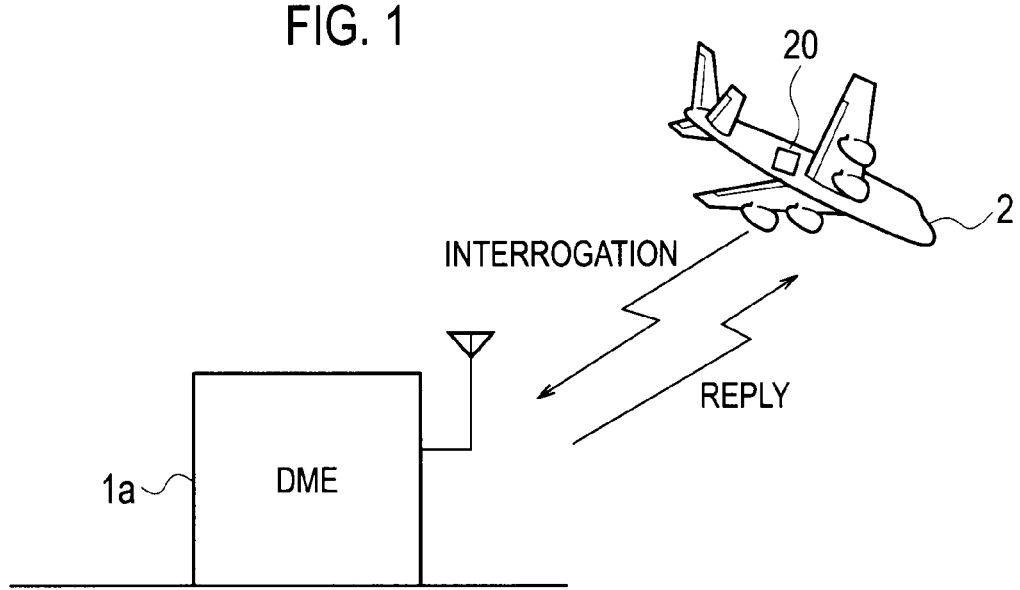
FIG. 1 is an illustration of a typical DME communicating with aircraft.
Figure 2:
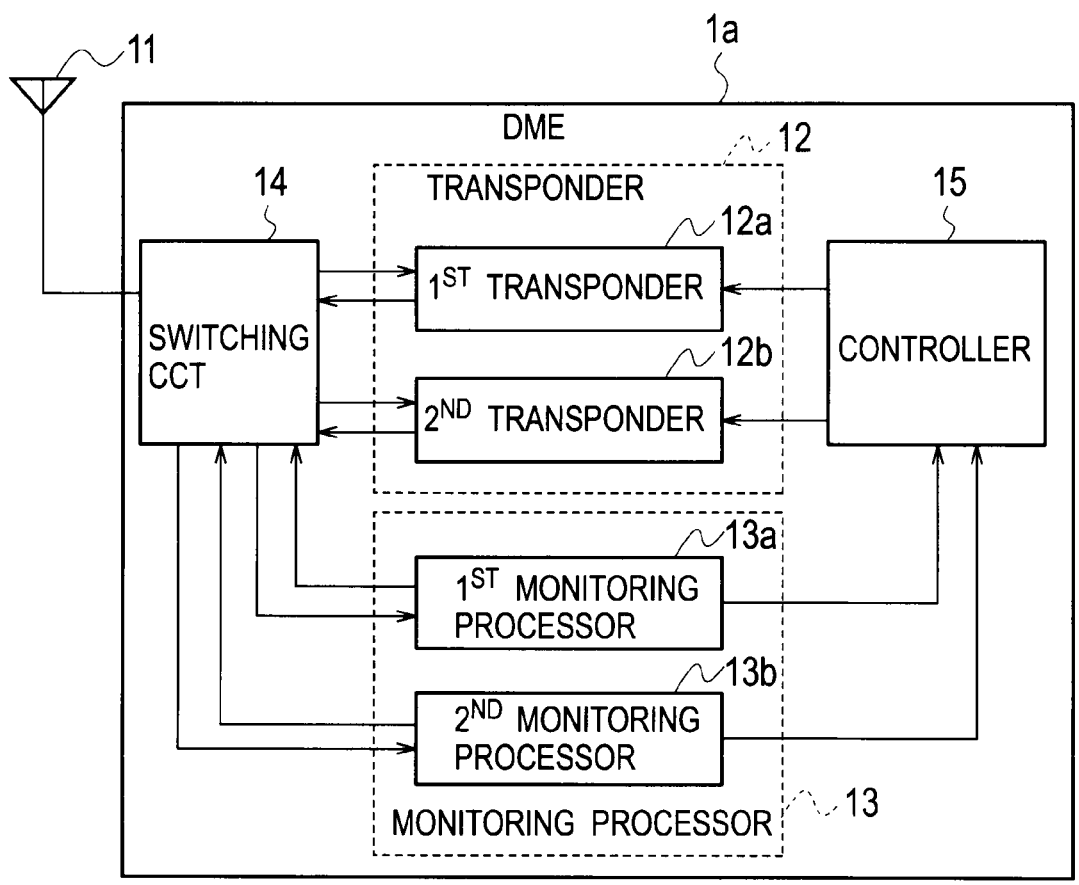
FIG. 2 is a functional block diagram of the DME of FIG. 1.

There will be described a distance measuring equipment (DME) according to the preferred embodiment of the present invention, with reference to the drawings. Like the conventional DME 1a illustrated in FIG. 1, the DME according to the present embodiment is located in a ground station, and configured to transmit replies responding to interrogations from aircraft 2. With respect to the conventional configuration, like elements in the embodiment are designated at like reference characters.

Figure 4:
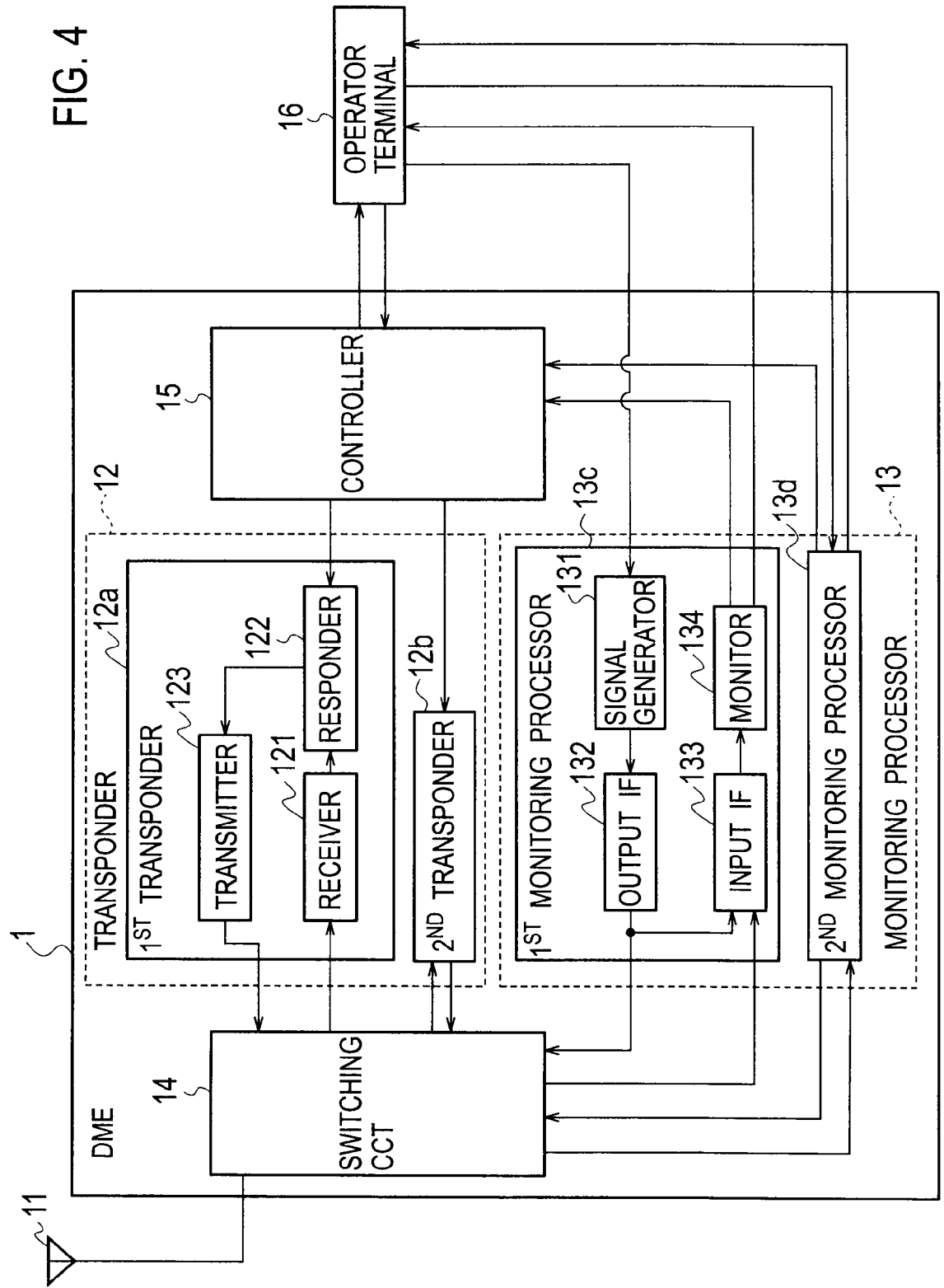
FIG. 4 is a functional block diagram of a DME monitor system in combination with a DME according to an embodiment of the present invention.

Referring to FIG. 4, designated at reference character 1 is the DME according to the present embodiment, which includes: an antenna 11; a transponder 12 configured for signal transmission and reception via the antenna 11, the transponder 12 being composed of first and second transponders 12a and 12b of an identical configuration; a monitoring processor 13 configured to monitor the performance of the transponder 12, the monitoring processor 13 being composed of first and second monitoring processors 13c and 13d of an identical configuration; a switching circuit 14 configured to switch interconnections among antenna 11, transponder 12, and monitoring processor 13; and a controller 15 configured to control actions of the transponder 12 and the monitoring processor 13. As shown in FIG. 4, the DME 1 is coupled with an operator terminal 16 to constitute a DME monitor system.

Further, as shown in FIG. 4, the first transponder 12a includes: a receiver 121 configured to receive a pulse pair from the switching circuit 14; a responder 122 configured for a later-described analysis of the received pulse pair to generate a pulse pair as necessary as a reply thereto; and a transmitter 123 adapted to have the reply input thereto from the responder 122, to output to the switching circuit 14.

The receiver 121 is adapted to receive a sequence of pulse pairs received at the antenna 11 and conducted thereto through the switching circuit 14, to output to the responder 122.

The responder 122 is configured for analysis of a respective pulse pair input thereto from the receiver 122, to determine whether or not it is a script-compliant interrogation transmitted from aircraft 2 to the DEM 1. With determination that the pulse pair is a script-compliant interrogation transmitted from aircraft 2 to the DEM 1, the responder 122 generates a reply responding to the interrogation, to output to the transmitter 123.

The transmitter 123 is configured to transmit the reply input from the responder 122, through the switching circuit 14, via the antenna 11.

Like the first transponder 12a, the second transponder 12b includes a receiver, a responder, and a transmitter, which are configured to implement the same processes as those of the first transponder 12a.

The DME 1 thus has a plurality of transponders 12a and 12b, allowing for an ensured transmission of a reply to any interrogation from aircraft 2. For instance, even with the occurrence of malfunction at the first transponder 12a, the second transponder 12b works normally, allowing the DME 1 to operate normally. In typical operation, simply either the first transponder 12a or the second transponder 12b is working, with the other waiting. If the transponder at work gets anomalous, it can be substituted by the waiting transponder during operation.

As shown in FIG. 4, the first monitoring processor 13 includes: a signal generator 131 configured to generate a pseudo interrogation as a pulse pair for monitoring the performance of the transponder 12; an output interface 132 configured to output a pseudo interrogation input thereto, to the switching circuit 14 and additionally to an input interface 133; the input interface 133 being configured to input pulse pairs such as a pseudo interrogation and a reply thereto; and a monitor 134 configured to monitor working status of the transponder 12 based on pulse pairs input thereto.

The signal generator 131 generates a pseudo interrogation, to output to the output interface 132. With a pseudo interrogation input from the signal generator 131, the output interface 132 makes, at a D/A converter 132a therein (see FIG. 5), conversion of the input pseudo interrogation as a digital signal into an analog signal, to provide an analog waveform of pseudo interrogation to be adjusted or modulated, as necessary, to output to the switching circuit 14 and the input interface 133. It is noted that the pseudo interrogation generated at the signal generator 131 is identical in format of style of twin pulses to a respective interrogation that the interrogator 20 of aircraft 2 transmits to the DME 1 for the purpose of distance measurement.

The input interface 133 makes, at an A/D converter 133a therein (see FIG. 5), analog-to-digital conversion of the pseudo interrogation input from the output interface 132, and that of a later-described reply input thereto through the switching circuit 14. The pseudo interrogation converted into a digital signal as well as the reply converted into a digital signal is output from the input interface 133 to the monitor 134. The monitor 134 is thereby given information, such as on if the reply is input to the input interface 133, as well as on the timing the reply is input thereto and the timing the pseudo interrogation is output from the output interface 132, and works thereon to monitor a performance of the transponder 12, and output a result of the monitoring to the operator terminal 16, which is operable by an operator.

Like the first monitoring processor 13c, the second monitoring processor 13d includes a signal generator, an output interface, an input interface, and a monitor which are configured to implement the same process as those of the first monitoring processor 13c.

The pseudo interrogation output from the monitoring processor 13 to the transponder 12 is identical in format of style to normal interrogations the interrogator 20 of aircraft 2 transmits, as described. Therefore, when the pseudo interrogation is input, the transponder 12 processes it like a normal interrogation received from interrogator 20. That is, at the transponder 12, when a pseudo interrogation is input to the responder 122, this generates a reply responding to the input pseudo interrogation. The responder 122 thus has a reply generated therein in response to a pseudo interrogation, this reply also being output by the transmitter 123 to the monitoring processor 13 through the switching circuit 14.

At the switching circuit 14, each signal received at and input from the antenna 11, as well as a pseudo interrogation input from the output interface 132, is output to the receiver 121. At the switching circuit 14, a reply responding to a normal interrogation is input from the transmitter 123, which is transmitted via the antenna 11 to aircraft 2. At the switching circuit 14, also a reply responding to a pseudo interrogation is input from the transmitter 123, which is output to the input interface 133.

There will be described the configuration of the monitoring processor 13 into details, with reference to FIG. 5. The monitoring processor 13 has the combination of signal generator 131, output interface 132, and monitor 134 configured as means for monitoring actions of the transponder 12, to thereby monitor the DME 1 for verification of a conforming performance.

For instance, the monitor 134 includes: a pulse pair detector 134a configured to detect from among signals input thereto a pulse pair in a reply P2, as twin pulses having a compliant pulse spacing; a delay monitor 134b configured for comparison between the timing the output interface 132 has output a pseudo interrogation and the timing a corresponding reply P2 is input, to check for a delay of reply P2, to output an alarm; a response efficiency monitor 134c configured for determination of a response efficiency of the transponder 12 depending on the number of input times of reply P2 to the number of output times of pseudo interrogation at the output interface 132, to check for a decreased response efficiency, to output an alarm; and a transmission rate monitor 134d configured to check for an increased or decreased transmission rate, to output an alarm.

The operator terminal 16 is adapted to check for an alarm or alarms input from the monitor 134, to detect occurrence of anomaly at the transponder 12, to cope with as necessary.

(Pulse Spacing Adjustment)

Figure 3:
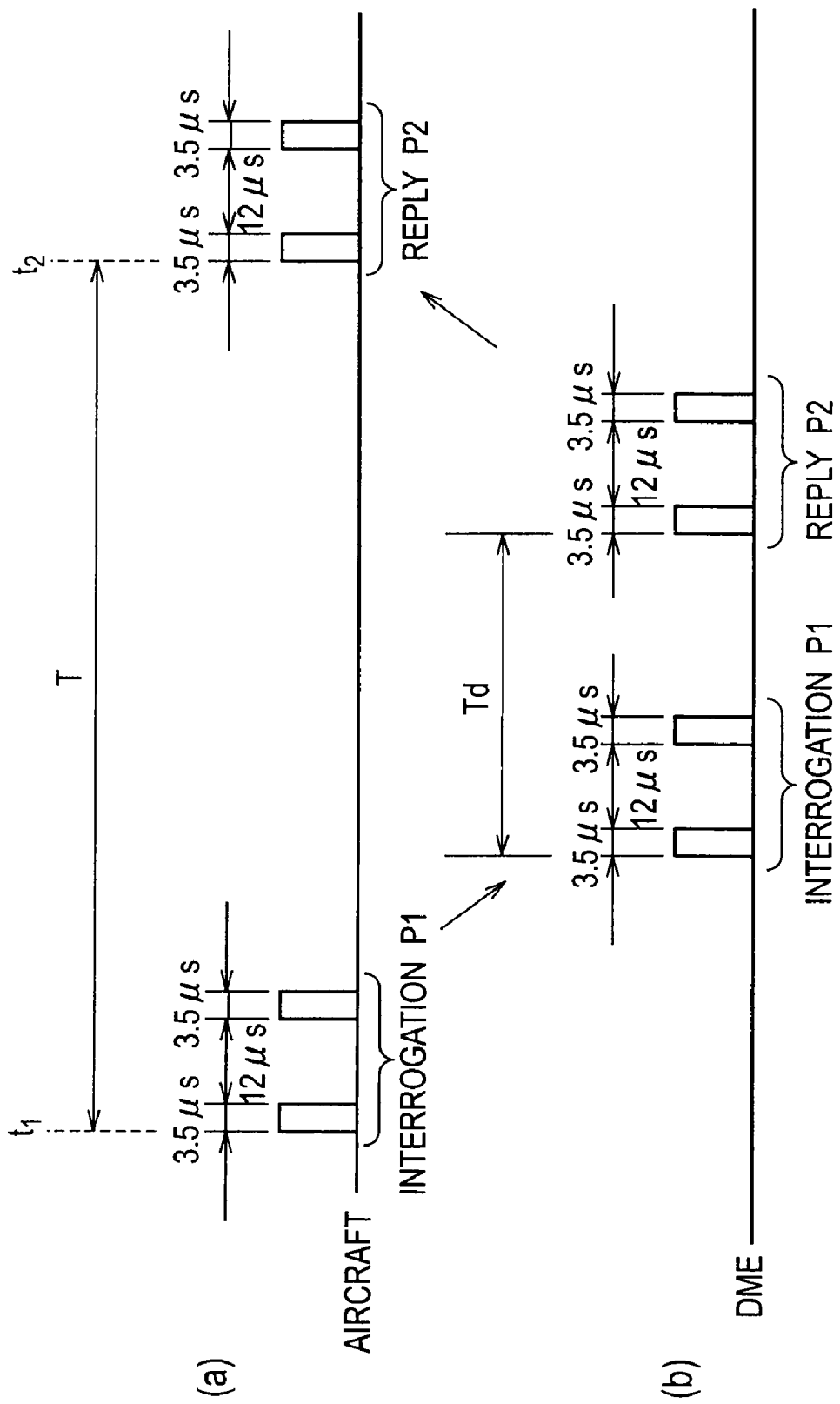
FIGS. 3(a) and 3(b) are time charts of signals to be transmitted and received between the DME and aircraft of FIG. 1.

The DME 1 receives, at the antenna 11, a series of interrogations P1 comprising twin pulses as described referring to FIGS. 3(*a*) and 3(*b*). The twin pulses are detected in the form of a pulse pair as a pair of pulses that has a compliant pulse spacing (in a nominal value: e.g. "12 µs" in FIGS. 3(*a*) and 3(*b*)) in accordance with the mode of operation employed at the DME 1. At the transponder 12, there is a check for a respective received pulse pair with a pulse spacing corresponding to "a prescribed nominal value" or within "a prescribed permissible range of a specified nominal value", to determine the pulse pair to be an interrogation P1.

Like this, the transponder 12 has to be adapted for performance to detect a pulse pair in received signals as being an interrogation P1, if the spacing between pulses of the pulse pair falls within a compliant range of values of pulse spacing (i.e. "a prescribed nominal value" or within "a prescribed permissible range of a specified nominal value"), and to determine received signals as being no interrogations P1, unless the spacing of pulses therein falls within the compliant value range of pulse spacing. Accordingly, the transponder 12 needs adaptation to verify actions as to whether or not a pulse pair having a compliant pulse spacing is detected as an interrogation P1, or whether or not a pulse pair uncompliant in pulse spacing is not detected as any interrogation P1.

For provision of a function to verify whether or not the transponder 12 is working for accurate detection of received signals with a compliant pulse spacing as an interrogation P1 to respond with transmission of a reply P2, at the monitoring processor 13, the signal generator 131 has a pulse spacing adjuster 131c configured to adjust the style, in terms of a pulse spacing of pulse pair, of a pseudo interrogation to be output. For instance, the pulse spacing adjuster 131c may follow an operation at the operator terminal 16 to set up the pulse spacing of a pulse pair in a pseudo interrogation.

It is noted that, though being variable in dependence on the mode of operation employed at the DME 1, the value range of pulse spacing now concerned is prescribed for the channel suffix X, by a nominal value of "12 µs", and for the channel suffix Y, by a nominal value of "36 µs". At the DME 1, preferably, pulse pairs should be detected as interrogations P1 even if the pulse spacing is deviated within a range of ±1.0 µs from either nominal value, so there is set a permissible range of ±1.0 µs.

Accordingly, the pulse spacing adjuster 131c is adapted to work, along with generation of pseudo interrogation, for adjustment to perturb the pulse spacing within the permissible range of ±1.0 µs its from the nominal value of "12 µs" or "36 µs", in order for checks to determine whether or not the transponder 12 is working for exact transmission of replies P2 responding to interrogations P1.

On the other hand, preferably, the DME 1, should not detect any pulse pair as an interrogation P1 if the pulse spacing is deviated by ±2.0 µs or more from either nominal value. Accordingly, for checks for erroneous transmission of reply P2, the pulse spacing adjuster 131c is adapted to work, along with generation of pseudo interrogations, for adjustment to perturb the pulse spacing by ±2.0 µs or more from either nominal value "12 µs" or "36 µs".

The delay monitor 134b works to output an alarm after the monitoring processor 13 has output a pseudo interrogation, if an input of a corresponding reply P2 is delayed. Further, the response efficiency monitor 134c works to output an alarm if no reply P2 is input, despite an output pseudo interrogation.

The operator terminal 16 is adapted for use of such alarms output from the monitor 134, to grasp occurrences of anomaly at the transponder 12. More specifically, the operator terminal 16 is adapted to work after the monitoring processor 13 has output a pseudo interrogation P1 with a pulse spacing within a compliant value range: if no alarm is input from the delay monitor 134b nor the response efficiency monitor 134c, to determine the transponder 12 to be normal; and if any such alarm is input, to detect an occurrence of anomaly at the transponder 12.

Further, the operator terminal 16 is adapted to work after the monitoring processor 13 has output a pseudo interrogation with a pulse spacing outside the compliant value range: if an alarm is input from the delay monitor 134b or the response efficiency monitor 134c, to determine the transponder 12 to be normal; and if no alarm is input, to detect an occurrence of anomaly at the transponder 12.

(Level Adjusting Function)

Signals to be received by the DME 1 have their levels encompassing over a wide range, and the DME 1 is required to have a performance for reception of interrogation P1, covering a maximal input level of −10 dBm and a minimal reception sensitivity of −91 dBm. Further, after reception of any interrogation P1 within the range of −10 dBm to −91 dBm, the transponder 12 is required to transmit a reply P2 responding the interrogation P1. Therefore, the transponder 12 needs verification of performance as to whether or not an interrogation P1 that has a compliant signal level is detected, and whether or not a pulse pair that is uncompliant in pulse spacing is not detected as any interrogation P1.

As a function of verifying the transponder 12 accurately working to detect and respond to an interrogation P1 of a compliant signal level, at the monitoring processor 13, the signal generator 131 has a signal level controller 131g configured to control adjustment of a signal level of a pseudo interrogation to be output. At the monitoring processor 13, the output interface 132 has a signal level adjuster 132b configured to adjust the signal level under control of the signal level controller 131g. For instance, the signal level controller 131g may follow an operation at the operator terminal 16 to control signal level of pseudo interrogation.

The DME 1 is required to detect a range of signal levels of interrogations P1, covering a maximal input level of −10 dBm and a minimal reception sensitivity of −91 dBm, as described.

Accordingly, for possible determination of whether or not a reply P2 is accurately transmitted in response to a received interrogation P1, the signal level controller 131g is adapted to work along with generation of a pseudo interrogation, to control the signal level adjuster 132b to implement adjustment of signal level of the pseudo interrogation within the range of maximal input level "−10 dBm" to minimal reception sensitivity "−91 dBm".

The DME 1 is required to exhibit a performance enabling a handling of signals outranging the signal level range of −10 to −91 dBm. Accordingly, for possible checks for erroneous transmission of reply P2, the signal level controller 131g is adapted to work along with generation of a pseudo interrogation, to control its signal level to adjust within a range of maximal input level "−10 dBm" or more, or minimal reception sensitivity "−91 dBm" or less.

The delay monitor 134b outputs an alarm after the monitoring processor 13 has output a pseudo interrogation, if an input of a corresponding reply P2 is delayed. Further, the response efficiency monitor 134c outputs an alarm if no reply P2 is input, despite an output pseudo interrogation.

The operator terminal 16 is adapted for use of such alarms output from the monitor 134, to grasp occurrences of anomaly at the transponder 12. More specifically, the operator terminal 16 may be operated to work after the monitoring processor 13 has output a pseudo interrogation within the range of maximal input level "−10 dBm" to minimal reception sensitivity "−91 dBm": if no alarm is input from the delay monitor 134b nor the response efficiency monitor 134c, to determine the transponder 12 to be normal; and if any such alarm is input, to detect an occurrence of anomaly at the transponder 12.

Further, the operator terminal 16 may be operated to work after the monitoring processor 13 has output a pseudo interrogation within a range of maximal input level "−10 dBm" or more, or minimal reception sensitivity "−91 dBm" or less: if an alarm is input from the delay monitor 134b or the response efficiency monitor 134c, to determine the transponder 12 to be normal; and if no alarm is input, to detect an occurrence of anomaly at the transponder 12.

(Rise Adjusting Function)

The DME 1 is required to have a performance responsible to act for any received interrogation P1 containing pulses each rising from 10% to 90% of maximum amplitude by a rise time within a range of 0.8 μs to 3 μs. Therefore, the transponder 12 needs verification of performance as to whether or not detection is made of an interrogation P1 that contains pulses each having a compliant rise time, and whether or not detection is not made of any interrogation that contains a pulse uncompliant in rise time.

As a function of verifying the transponder 12 accurately working to detect and respond to an interrogation P1 that contains pulses each having a compliant rise time, at the monitoring processor 13, the signal generator 131 has a rise adjuster 131d configured to adjust the style, in terms of a rising edge of respective pulse, of a pseudo interrogation to be output. For instance, the rise adjuster 131d may follow an operation at the operator terminal 16 to adjust a rise of each pulse contained in a pseudo interrogation.

The DME 1 is required to be able to detect an interrogation P1 that has pulses each rising from 10% to 90% of maximum amplitude by a rise time within a range of 0.8 μs to 3 μs, as described.

Accordingly, for possible determination of whether or not a reply P2 is accurately transmitted in response to an interrogation P1 received at the transponder 12, the rise adjuster 131d is adapted to work along with generation of a pseudo interrogation, to adjust a rising edge of a respective pulse of the pseudo interrogation, to render a rise from 10% to 90% of maximum amplitude by a rise time within a range of 0.8 μs to 3 μs.

Preferably, the DME 1 should not detect any received pulse pair as an interrogation P1, if it has a pulse uncompliant in rise time, that is, if the rise time for the pulse to rise from 10% to 90% of maximum amplitude resides outside the range of 0.8 μs to 3 μs. Accordingly, for possible checks for erroneous transmission of reply P2, the rise adjuster 131d is adapted to work along with generation of a pseudo interrogation, to adjust pulses therein to render their rising edges uncompliant.

The delay monitor 134b outputs an alarm after the monitoring processor 13 has output a pseudo interrogation, if an input of a corresponding reply P2 is delayed. Further, the response efficiency monitor 134c outputs an alarm if no reply P2 is input, despite an output pseudo interrogation.

The operator terminal 16 is adapted for use of such alarms output from the monitor 134, to grasp occurrences of anomaly at the transponder 12. More specifically, the operator terminal 16 may be operated to work after the monitoring processor 13 has output a pseudo interrogation containing pulses compliant at rising edges: if no alarm is input from the delay monitor 134b nor the response efficiency monitor 134c, to determine the transponder 12 to be normal; and if any such alarm is input, to detect an occurrence of anomaly at the transponder 12.

Further, the operator terminal 16 may be operated to work after the monitoring processor 13 has output a pseudo interrogation containing a pulse with an uncompliant rising edge: if an alarm is input from the delay monitor 134b or the response efficiency monitor 134c, to determine the transponder 12 to be normal; and if no alarm is input, to detect an occurrence of anomaly at the transponder 12.

(Multi-Path Generating Function)

There may be an interrogation P1 received in a multi-path state at the DME 1, and preferably the DME 1 should detect such an interrogation P1 if the multi-path state is kept within a prescribed conforming range. Accordingly, the monitoring processor 13 needs a verification of performance as to whether or not the transponder 12 is working to detect an interrogation P1 even in a multi-path state, if this state is within the conforming range.

As a function of verifying the transponder 12 accurately working to detect and respond to an interrogation P1 in a conforming multi-path state, at the monitoring processor 13, the signal generator 131 has a combination of a multi-path generator 131f and a mixer 131e configured to render the style, in terms of a waveform of twin pulses, of a pseudo interrogation to be output in a multi-path state. For instance, the multi-path generator 131f may follow an operation at the operator terminal 16 to generate pulses to be synthesized to provide a pseudo interrogation in a multi-path state.

The multi-path generator 131f is configured for generation of a multi-path signal with conformity to be verified to the ED-57 standard, for verification of a reply at the transponder 12. More specifically, the multi-path generator 131f generates, within a conforming range, a composite pulse composed of pulses with levels of −6 dBm or less of pulses contained in an interrogation P1. Or otherwise, the multi-path generator 131f generates, within a conforming range, a composite pulse composed of pulses delayed within a range of 0 to 7 μs from pulses contained in a pseudo interrogation. Or else, the multi-path generator 131f generates, within a conforming range, a composite pulse composed of pulses different in phase by 0 or π radians from pulses contained in a pseudo interrogation. Then, at the mixer 131e, the composite pulse the multi-path generator 131f has generated is synthesized with a pseudo interrogation. The multi-path generator 131f may be adapted to generate a non-conforming composite pulse, to enable checks for erroneous transmission of reply P2.

The delay monitor 134b outputs an alarm after the monitoring processor 13 has output a pseudo interrogation, if an input of a corresponding reply P2 is delayed. Further, the response efficiency monitor 134c outputs an alarm if no reply P2 is input, despite an output pseudo interrogation.

The operator terminal 16 is adapted for use of such alarms output from the monitor 134, to grasp occurrences of anomaly at the transponder 12. More specifically, the operator terminal 16 may be operated to work after the monitoring processor 13 has output a pseudo interrogation with conforming composite pulses synthesized therein: if no alarm is input from the delay monitor 134b nor the response efficiency monitor 134c, to determine the transponder 12 to be normal; and if any such alarm is input, to detect an occurrence of anomaly at the transponder 12.

(Noise Generating Function)

There may be noises received at the DME 1, and the DME 1 should be adapted to work, even after reception of noises, to exhibit performances as necessary to process received interrogations P1. Accordingly, the transponder 12 needs a verification of performance as to whether or not an interrogation P1 is detected even after reception of noises.

As a function of verifying the transponder 12 accurately working to detect and respond to an interrogation P1 following noises, at the monitoring processor 13, the signal generator 131 has a noise generator 131b configured to generate noises to output before outputting a pseudo interrogation, thus changing the style of pseudo interrogation.

For instance, the noise generator 131b may be adapted to generate pulses with levels greater by 60 dB than pulses of a pseudo interrogation conforming to the ED-57 standard, to output as noise pulses 7.95 s before the pseudo interrogation.

The delay monitor 134b outputs an alarm after the monitoring processor 13 has output a pseudo interrogation, if an input of a corresponding reply P2 is delayed. Further, the response efficiency monitor 134c outputs an alarm if no reply P2 is input, despite an output pseudo interrogation.

The operator terminal 16 is adapted for use of such alarms output from the monitor 134, to grasp occurrences of anomaly at the transponder 12. More specifically, the operator terminal 16 may be operated to work after the monitoring processor 13 has output noise pulses: if no alarm is input from the delay monitor 134b nor the response efficiency monitor 134c, to determine the transponder 12 to be normal; and if any such alarm is input, to detect an occurrence of anomaly at the transponder 12.

(Transmission Rate Adjusting Function)

At the DME 1, respective replies P2 has to be transmitted by prescribed transmission rates. Accordingly, the monitoring processor 13 needs verification that the transponder 12 is working to transmit replies P2 by prescribed transmission rates.

As a function of verifying the transponder 12 working to transmit replies P2 by prescribed transmission rates, at the monitoring processor 13, the signal generator 131 has a transmission rate adjuster 131a configured to adjust transmission rates of pseudo interrogations within a range of 0 to 8191 pp/s.

More specifically, the transponder 12 is required to keep the response ratio from varying over 1 dB for a range of response rates from 0 to 2,400 pp/s. The transponder 12 is required to keep the response ratio from varying over 3 dB for a range of response rates from 2,400 to 3,600 pp/s. The transponder 12 is required to keep the response rate from exceeding a maximum response rate of 4,000 pp/s for a range of loads of the transponder 12 exceeding a 90% response capability (approx. 6,000 pp/s).

Accordingly, the transmission rate adjuster 131a may adjust the transmission rate of pseudo interrogations within the range of 0 to 2,400 pp/s, for instance.

In this case, the transmission rate monitor 134d is adapted to work: if the response ratio of the transponder 12 is kept from varying over 1 dB, to determine the transponder 12 as being normal, and output no alarms; but if the response ratio is varied over 1 dB, to determine the transponder 12 as having an anomaly occurred therein, and output an alarm to the operator terminal 16.

The transmission rate adjuster 131a may adjust the transmission rate of pseudo interrogations within the range of 2,400 to 3,600 pp/s.

In this case, the transmission rate monitor 134d is adapted to work: if the response ratio of the transponder 12 is kept from varying over 3 dB, to determine the transponder 12 as being normal, and output no alarms; but if the response ratio is varied over 3 dB, to determine the transponder 12 as having an anomaly occurred therein, and output an alarm to the operator terminal 16.

The transmission rate adjuster 131a may adjust the transmission rate of pseudo interrogations within a range of values (6,000 pp/s or more) corresponding to the range of loads of the transponder 12 exceeding a 90% response capability.

In this case, the transmission rate monitor 134d is adapted to work: if the response rate of the transponder 12 is kept from exceeding 4,000 pp/s, to determine the transponder 12 as being normal, and output no alarms; but if the response rate exceeds 4,000 pp/s, to determine the transponder 12 as having an anomaly occurred therein, and output an alarm to the operator terminal 16.

The operator terminal 16 is adapted for use of such an alarm output from the monitor 134, to grasp an occurrence of any anomaly at the transponder 12. More specifically, the operator terminal 16 may be operated to work after the monitoring processor 13 has output pulse pairs: if no alarm is input from the transmission rate monitor 134d, to determine the transponder 12 to be normal; and if such an alarm is input, to detect an occurrence of anomaly at the transponder 12.

(Frequency Adjusting Function)

The DME is to receive various frequencies of signals, while interrogations P1 to be processed at the DME 1 have frequencies compliant with an associated prescript. Those interrogations having uncompliant frequencies may have been transmitted to any DME else, so the DME 1 receiving some interrogations uncompliant in frequency should not work to reply any of them. Accordingly, the monitoring processor 13 is required to monitor whether or not the transponder 12 is working to transmit a reply P2 simply in response to an interrogation P1 of a compliant frequency.

As a function of verifying the transponder 12 accurately working to detect an interrogation P1 that has a compliant frequency, and respond thereto with transmission of a reply P2, at the monitoring processor 13, the output interface 132 has a combination of a mixer 132c and a frequency adjuster 132d configured to adjust the style, in terms of a frequency, of a pseudo interrogation by steps of 100 kHz within a range of nominal channel frequencies (960 to 1,215 MHz).

More specifically, the transponder 12 has a number of frequencies (as nominal frequencies) prescribed for targets to be processed, and is set up to work: if a received interrogation has a frequency deviated from a corresponding nominal frequency by a difference under 100 kHz, to determine the interrogation P1 as having been transmitted to own DME, and respond thereto with a reply; but if the difference is over 100 kHz, to determine the interrogation as having been transmitted to any DME else, and respond thereto with no reply.

Therefore, the frequency adjuster 132d may work, along with a process of outputting a pseudo interrogation, to adjust the frequency of the pseudo interrogation to a value of nominal frequency plus or minus 100 kHz.

In this case, the delay monitor 134b is adapted to work, after the monitoring processor 13 has output a pseudo interrogation with a frequency equal to a nominal frequency plus or minus 100 kHz, to output an alarm if an input of a corresponding reply P2 is delayed. Further, the response efficiency monitor 134c is adapted to output an alarm, if no reply P2 is input, despite a pseudo interrogation output with a frequency equal to a nominal frequency plus or minus 100 kHz The frequency adjuster 132d may work, along with a process of outputting a pseudo interrogation, to adjust the frequency of the pseudo interrogation to a value of nominal frequency plus or minus 900 kHz.

In this case, the delay monitor 134b is adapted to work, after the monitoring processor 13 has output a pseudo interrogation with a frequency equal to a nominal frequency plus or minus 900 kHz or more, to output an alarm if an input of a corresponding reply P2 is delayed. Further, the response efficiency monitor 134c is adapted to output an alarm, if no reply P2 is input, despite a pseudo interrogation output with a frequency equal to a nominal frequency plus or minus 900 kHz or more.

(Load Adjusting Function)

The DME 1 may receive interrogations P1 from many aircraft 2, whereby the transponder 12 may experience loads exceeding a 90% response capability. Under this situation, the transponder 12 should abide by a maximum response rate, not to exceed, so it is required to lower the gain to turn down weak interrogations. Accordingly, the transponder 12 needs a verification of performance as to whether or not the transponder 12 is working with a load not exceeding the 90% response capability. More specifically, it should be verified that the transponder 12 is working when overloaded, to control the transmission rate and the signal level, to respond to interrogations of low signal levels with no replies.

As a function of verifying whether or not the transponder 12 is working, with a load exceeding 90% of the response capability, to lower the gain to restrict responding to weak interrogations, the monitoring processor 13 has an overload adjuster 131h configured to control the load imposed thereon to output pseudo interrogations. More specifically, the overload adjuster 131h is configured to control the transmission rate adjuster 131a for adjustment of transmission rate, and control the signal level adjuster 132d for adjustment of signal level, to output signals different in level within a constant interval of time under an overloaded state (4,000 pp/s or more).

For instance, the overload adjuster 131h may control both transmission rate adjuster 131a and signal level adjuster 132d for adjustment of transmission rate and control signal level to output pseudo interrogations at timings exceeding 90% of a response capability of the transponder 12.

In this case, the transmission rate monitor 134d is adapted to work: if the response rate of reply P2 at the transponder 12 is kept from exceeding a prescribed number of times, to determine the transponder 12 as being normal, and output no alarms; but if the response rate exceeds the prescribed number of times, to determine the transponder 12 as having an anomaly occurred therein, and output an alarm to the operator terminal 16.

The operator terminal 16 is adapted for use of such an alarm output from the monitor 134, to grasp an occurrence of any anomaly at the transponder 12. More specifically, the operator terminal 16 may be operated to work after the monitoring processor 13 has output pulse pairs: if no alarm is input from the transmission rate monitor 134d, to determine the transponder 12 to be normal; and if such an alarm is input, to detect an occurrence of anomaly at the transponder 12.

As will be seen from the foregoing description, according to the best mode of embodiment of the present invention, a distance measuring equipment 1 includes a monitoring processor 13 comprising any of measures for adjustment of style, level, and transmission rate of a pseudo interrogation, for use to implement a verification of performance of a transponder 12, permitting a facilitated verification of performance of the transponder 12 without employing dedicated jigs or devices, allowing for an enhanced efficiency of performance verification.

What is claimed is:

1. A distance measuring equipment comprising:
a transponder configured to transmit a reply in response to an interrogation input thereto, the interrogation comprising twin pulses composed of a pair of pulses having a prescribed spacing; and
a monitoring processor configured to transmit to the transponder a pseudo interrogation identical in format to the interrogation, receive from the transponder a reply responding to the pseudo interrogation, and monitor a performance of the transponder, the monitoring processor comprising:
a pulse spacing adjuster configured to adjust a pulse spacing of a pair of pulses constituting twin pulses of the pseudo interrogation along with generation of the pseudo interrogation; and
a monitor configured to output an alarm in response to a failed reception or a delayed reception of a reply from the transponder after transmission of the pseudo interrogation.

2. A distance measuring equipment monitoring system comprising:
a distance measuring equipment according to claim 1; and
a verifying equipment configured to determine the transponder as being normal in response to an alarm input from the distance measuring equipment after transmission of a pseudo interrogation prescript-compliant in format, level, and transmission rate from the distance measuring equipment to the transponder, and determine the transponder as being anomalous in response to an alarm input from the distance measuring equipment after transmission of a pseudo interrogation prescript-uncompliant in format, level, or transmission rate from the distance measuring equipment to the transponder.

3. A distance measuring equipment comprising:
a transponder configured to transmit a reply in response to an interrogation input thereto, the interrogation having a prescribed format and a prescribed signal level; and a monitoring processor configured to transmit to the transponder a pseudo interrogation identical in format to the interrogation, receive from the transponder a reply responding to the pseudo interrogation, and monitor a performance of the transponder, the monitoring processor comprising:
- a signal level adjuster configured to adjust the signal level of the pseudo interrogation along with generation of the pseudo interrogation; and
- a monitor configured to output an alarm in response to a failed reception or a delayed reception of a reply from the transponder after transmission of the pseudo interrogation.

4. A distance measuring equipment monitoring system comprising:
- a distance measuring equipment according to claim 3; and
- a verifying equipment configured to determine the transponder as being normal in response to an alarm input from the distance measuring equipment after transmission of a pseudo interrogation prescript-compliant in format, level, and transmission rate from the distance measuring equipment to the transponder.

5. A distance measuring equipment comprising:
a transponder configured to transmit a reply in response to an interrogation input thereto, the interrogation including a pulse of a prescribed format; and
a monitoring processor configured to transmit to the transponder a pseudo interrogation identical in format to the interrogation, receive from the transponder a reply responding to the pseudo interrogation, and monitor a performance of the transponder, the monitoring processor comprising:
- a rise adjuster configured to adjust a rise of the pulse along with generation of the pseudo interrogation; and
- a monitor configured to output an alarm in response to a failed reception or a delayed reception of a reply from the transponder after transmission of the pseudo interrogation.

6. A distance measuring equipment monitoring system comprising:
- a distance measuring equipment according to claim 5; and
- a verifying equipment configured to determine the transponder as being normal in response to an alarm input from the distance measuring equipment after transmission of a pseudo interrogation prescript-compliant in format, level, and transmission rate from the distance measuring equipment to the transponder, and determine the transponder as being anomalous in response to an alarm input from the distance measuring equipment after transmission of a pseudo interrogation prescript-uncompliant in format, level, or transmission rate from the distance measuring equipment to the transponder.

7. A distance measuring equipment comprising:
a transponder configured to transmit a reply in response to an interrogation input thereto, the interrogation including a pulse of a prescribed format; and
a monitoring processor configured to transmit to the transponder a pseudo interrogation identical in format to the interrogation, receive from the transponder a reply responding to the pseudo interrogation, and monitor a performance of the transponder, the monitoring processor comprising:
- a multi-path generator configured to generate pulses to render the pseudo interrogation in a multi-path state along with generation of the pseudo interrogation; and
- a monitor configured to output an alarm in response to a failed reception or a delayed reception of a reply from the transponder after transmission of the pseudo interrogation.

8. A distance measuring equipment monitoring system comprising:
- a distance measuring equipment according to claim 7; and
- a verifying equipment configured to determine the transponder as being normal in response to an alarm input from the distance measuring equipment after transmission of a pseudo interrogation prescript-compliant in format, level, and transmission rate from the distance measuring equipment to the transponder.

9. A distance measuring equipment comprising:
a transponder configured to transmit a reply in response to an interrogation input thereto, the interrogation having a prescribed format; and
a monitoring processor configured to transmit to the transponder a pseudo interrogation identical in format to the interrogation, receive from the transponder a reply responding to the pseudo interrogation, and monitor a performance of the transponder, the monitoring processor comprising:
- a noise generator configured to generate noises along with generation of the pseudo interrogation; and
- a monitor configured to output an alarm in response to a failed reception or a delayed reception of a reply from the transponder after transmission of the pseudo interrogation synthesized with a prescribed noise.

10. A distance measuring equipment monitoring system comprising:
- a distance measuring equipment according to claim 9; and
- a verifying equipment configured to determine the transponder as being normal in response to an alarm input from the distance measuring equipment after transmission of a pseudo interrogation prescript-compliant in format, level, and transmission rate from the distance measuring equipment to the transponder.

11. A distance measuring equipment comprising:
a transponder configured to transmit a reply in response to an interrogation input thereto; and
a monitoring processor configured to transmit to the transponder a pseudo interrogation identical in format to the interrogation, receive from the transponder a reply responding to the pseudo interrogation, and monitor a performance of the transponder, the monitoring processor comprising:
- a transmission rate adjuster configured to adjust a transmission rate for transmission of the pseudo interrogation; and
- a monitor configured to output an alarm in response to a failed reception of a reply from the transponder after transmission of the pseudo interrogation at a prescribe transmission rate.

12. A distance measuring equipment monitoring system comprising:
- a distance measuring equipment according to claim 11; and
- a verifying equipment configured to determine the transponder as being normal in response to an alarm input from the distance measuring equipment after transmission of a pseudo interrogation prescript-compliant in format, level, and transmission rate from the distance measuring equipment to the transponder, and determine the transponder as being anomalous in response to an alarm input from the distance measuring equipment after transmission of a pseudo interrogation prescript-uncompliant in format, level, or transmission rate from the distance measuring equipment to the transponder.

13. A distance measuring equipment comprising:
a transponder configured to transmit a reply in response to an interrogation input thereto, the interrogation having a prescribed frequency; and
a monitoring processor configured to transmit to the transponder a pseudo interrogation identical in format to the interrogation, receive from the transponder a reply responding to the pseudo interrogation, and monitor a performance of the transponder, the monitoring processor comprising:
a frequency adjuster configured to adjust a frequency of the pseudo interrogation along with generation of the pseudo interrogation; and
a monitor configured to output an alarm in response to a failed reception or a delayed reception of a reply from the transponder after transmission of the pseudo interrogation having a prescribed frequency.

14. A distance measuring equipment monitoring system comprising:
a distance measuring equipment according to claim 13; and
a verifying equipment configured to determine the transponder as being normal in response to an alarm input from the distance measuring equipment after transmission of a pseudo interrogation prescript-compliant in format, level, and transmission rate from the distance measuring equipment to the transponder, and determine the transponder as being anomalous in response to an alarm input from the distance measuring equipment after transmission of a pseudo interrogation prescript-uncompliant in format, level, or transmission rate from the distance measuring equipment to the transponder.

15. A distance measuring equipment comprising:
a transponder configured to transmit a reply in response to an interrogation input thereto; and
a monitoring processor configured to transmit to the transponder a pseudo interrogation identical in format to the interrogation, receive from the transponder a reply responding to the pseudo interrogation, and monitor a performance of the transponder, the monitoring processor comprising:
a load adjuster configured to adjust a load on the transponder along with transmission of the pseudo interrogation; and
a monitor configured to output an alarm in response to a failed reception of a reply from the transponder after transmission of the pseudo interrogation with a prescribed load.

16. A distance measuring equipment monitoring system comprising:
a distance measuring equipment according to claim 15; and
a verifying equipment configured to determine the transponder as being normal in response to an alarm input from the distance measuring equipment after transmission of a pseudo interrogation prescript-compliant in format, level, and transmission rate from the distance measuring equipment to the transponder, and determine the transponder as being anomalous in response to an alarm input from the distance measuring equipment after transmission of a pseudo interrogation prescript-uncompliant in format, level, or transmission rate from the distance measuring equipment to the transponder.

* * * * *